(12) United States Patent
Said et al.

(10) Patent No.: US 10,091,282 B2
(45) Date of Patent: Oct. 2, 2018

(54) METADATA-DRIVEN DYNAMIC LOAD BALANCING IN MULTI-TENANT SYSTEMS

(71) Applicants: Bare Said, St. Leon-Rot (DE); Frank Jentsch, Muehlhausen (DE); Frank Brunswig, Heidelberg (DE)

(72) Inventors: Bare Said, St. Leon-Rot (DE); Frank Jentsch, Muehlhausen (DE); Frank Brunswig, Heidelberg (DE)

(73) Assignee: SAP SE, Walldorf (DE)

( * ) Notice: Subject to any disclaimer, the term of this patent is extended or adjusted under 35 U.S.C. 154(b) by 456 days.

(21) Appl. No.: 13/916,286

(22) Filed: Jun. 12, 2013

(65) Prior Publication Data
US 2014/0372550 A1    Dec. 18, 2014

(51) Int. Cl.
*G06F 15/167*    (2006.01)
*H04L 29/08*    (2006.01)

(52) U.S. Cl.
CPC .................. *H04L 67/1008* (2013.01)

(58) Field of Classification Search
CPC . H04L 67/1008; H04L 67/1012; H04L 47/24; H04L 47/783; H04L 67/1097; H04L 67/42; H04L 67/10; G06F 17/30424; G06F 17/30864
USPC ......................... 709/213, 203, 224
See application file for complete search history.

(56) References Cited

U.S. PATENT DOCUMENTS

| | | | |
|---|---|---|---|
| 5,619,696 A * | 4/1997 | Nakagawa ............ | G06F 9/4426 711/3 |
| 5,933,849 A * | 8/1999 | Srbljic ................ | G06F 12/0813 707/E17.12 |
| 6,698,174 B2 | 3/2004 | Martignon | |
| 7,225,432 B2 | 5/2007 | Jentsch et al. | |
| 7,225,433 B2 | 5/2007 | Jentsch et al. | |
| 7,315,853 B2 | 1/2008 | Brunswig et al. | |
| 7,454,660 B1 | 11/2008 | Kolb et al. | |
| 7,480,920 B2 | 1/2009 | Brendle et al. | |
| 7,489,920 B2 | 1/2009 | Brendle et al. | |
| 7,487,512 B2 | 2/2009 | Brunswig et al. | |

(Continued)

OTHER PUBLICATIONS

U.S. Appl. No. 10/744,384, filed Dec. 17, 2003, Brendle et al.

(Continued)

*Primary Examiner* — Tonia L Dollinger
*Assistant Examiner* — Kristoffer L S Sayoc
(74) *Attorney, Agent, or Firm* — Fish & Richardson P.C.

(57) ABSTRACT

The disclosure generally describes computer-implemented methods, computer program products, and systems for providing metadata-driven dynamic load balancing in multi-tenant systems. A computer-implemented method includes: identifying a request related to a model-based application executing in a multi-tenant system associated with a plurality of application servers and identifying at least one object in the model-based application associated with the request. At least one application server is identified as associated with a locally-cached version of a runtime version of the identified object, and a determination of a particular one of the identified application servers to send the identified request for processing is based on a combination of the availability of a locally-cached version of the runtime version at the particular application server and the server's processing load. The request is then sent to the determined application server for processing.

18 Claims, 4 Drawing Sheets

(56) References Cited

U.S. PATENT DOCUMENTS

| | | | |
|---|---|---|---|
| 7,506,336 B1* | 3/2009 | Ninan | 717/175 |
| 7,533,103 B2 | 5/2009 | Brendle et al. | |
| 7,536,673 B2 | 5/2009 | Brendle et al. | |
| 7,653,914 B2* | 1/2010 | Krohn | G06F 8/71 |
| | | | 717/122 |
| 7,676,816 B2 | 3/2010 | Brunswig et al. | |
| 7,685,114 B2 | 3/2010 | Brunswig et al. | |
| 7,685,268 B2 | 3/2010 | Brunswig et al. | |
| 7,685,568 B2 | 3/2010 | Brendle et al. | |
| 7,698,174 B2 | 4/2010 | Brunswig et al. | |
| 7,702,650 B2 | 4/2010 | Brunswig et al. | |
| 7,725,907 B2 | 5/2010 | Bloching et al. | |
| 7,730,412 B2 | 6/2010 | Said | |
| 7,765,494 B2 | 7/2010 | Brunswig et al. | |
| 7,730,146 B1 | 8/2010 | Brunswig et al. | |
| 7,769,821 B2 | 8/2010 | Brunswig et al. | |
| 7,770,146 B2 | 8/2010 | Brunswig et al. | |
| 7,774,463 B2 | 8/2010 | Bloching et al. | |
| 7,778,965 B2 | 8/2010 | Bindewald et al. | |
| 7,797,370 B2 | 9/2010 | Brunswig et al. | |
| 7,801,996 B2 | 9/2010 | Brunswig et al. | |
| 7,810,102 B2 | 10/2010 | Brendle et al. | |
| 7,840,944 B2 | 11/2010 | Brunswig et al. | |
| 7,844,615 B2 | 11/2010 | Brunswig et al. | |
| 7,865,900 B2 | 1/2011 | Aakolk et al. | |
| 7,877,695 B2 | 1/2011 | Brunswig et al. | |
| 7,890,959 B2 | 2/2011 | Brunswig et al. | |
| 7,900,190 B2 | 3/2011 | Brunswig et al. | |
| 7,900,216 B2 | 3/2011 | Brunswig et al. | |
| 7,908,248 B2 | 3/2011 | Brunswig et al. | |
| 7,917,524 B2 | 3/2011 | Brunswig et al. | |
| 7,930,251 B2 | 4/2011 | Bloching et al. | |
| 7,966,603 B2 | 6/2011 | Brunswig et al. | |
| 7,894,020 B2 | 7/2011 | Brunswig et al. | |
| 7,984,020 B2 | 7/2011 | Brunswig et al. | |
| 9,208,188 B2* | 12/2015 | Ott | G06F 17/30575 |
| 2002/0026560 A1* | 2/2002 | Jordan | G06F 9/505 |
| | | | 711/120 |
| 2003/0167349 A1* | 9/2003 | Krohn | G06F 9/44536 |
| | | | 719/311 |
| 2005/0091276 A1 | 4/2005 | Brunswig et al. | |
| 2005/0102319 A1* | 5/2005 | Hoeft | G06F 9/4428 |
| 2005/0138113 A1 | 6/2005 | Brendle et al. | |
| 2005/0283478 A1* | 12/2005 | Choi | H04L 67/02 |
| 2006/0161563 A1* | 7/2006 | Besbris et al. | 707/100 |
| 2007/0006041 A1 | 1/2007 | Brunswig et al. | |
| 2007/0061431 A1 | 3/2007 | Brunswig et al. | |
| 2007/0073702 A1 | 3/2007 | Brunswig et al. | |
| 2007/0100943 A1 | 5/2007 | Brunswig et al. | |
| 2007/0124740 A1 | 5/2007 | Brunswig et al. | |
| 2007/0157167 A1 | 7/2007 | Brendle et al. | |
| 2007/0192300 A1* | 8/2007 | Reuther | G06F 17/30427 |
| 2007/0226751 A1 | 9/2007 | Brendle et al. | |
| 2007/0233728 A1 | 10/2007 | Puteick et al. | |
| 2007/0260732 A1* | 11/2007 | Koretz | 709/226 |
| 2007/0271107 A1 | 11/2007 | Fiedler et al. | |
| 2008/0005623 A1 | 1/2008 | Said | |
| 2008/0010074 A1 | 1/2008 | Brunswig et al. | |
| 2008/0120597 A1 | 5/2008 | Brunswig et al. | |
| 2008/0147455 A1 | 6/2008 | Brunswig et al. | |
| 2008/0148166 A1 | 6/2008 | Brunswig et al. | |
| 2008/0195622 A1* | 8/2008 | Lelcuk et al. | 707/9 |
| 2008/0244616 A1 | 10/2008 | Brunswig et al. | |
| 2009/0019424 A1 | 1/2009 | Klein et al. | |
| 2009/0144721 A1 | 6/2009 | Wagner et al. | |
| 2009/0150473 A1 | 6/2009 | Brunswig et al. | |
| 2011/0066660 A1 | 3/2011 | Aakolk et al. | |
| 2011/0197287 A1* | 8/2011 | Hess et al. | 726/30 |

OTHER PUBLICATIONS

U.S. Appl. No. 10/747,020, filed Dec. 23, 2003, Brendle et al.
U.S. Appl. No. 10/954,904, filed Sep. 30, 2004, Brunswig et al.
U.S. Appl. No. 10/963,337, filed Oct. 11, 2004, Brunswig et al.
U.S. Appl. No. 10/963,487, filed Oct. 12, 2004, Brunswig et al.
U.S. Appl. No. 12/975,096, filed Dec. 21, 2010, Jentsch et al.
U.S. Appl. No. 12/975,813, filed Dec. 22, 2010, Brunwig et al.
U.S. Appl. No. 12/980,170, filed Dec. 28, 2010, Ritter et al.
U.S. Appl. No. 13/162,442, filed Jun. 16, 2011, Said et al.
U.S. Appl. No. 13/207,151, filed Aug. 10, 2011, Said et al.

* cited by examiner

METADATA-DRIVEN DYNAMIC LOAD BALANCING IN MULTI-TENANT SYSTEMS

TECHNICAL FIELD

The present disclosure related to methods and systems for providing metadata-driven dynamic load balancing in multi-tenant systems.

BACKGROUND

Multi-tenant systems refer to software architectures where a single instance of software runs on a server while serving multiple clients, or tenants. Multi-tenancy is contrasted with multi-instance architectures, where separate software instances or hardware systems are provided for different clients. Multi-tenancy is a key attribute for cloud computing solutions, and allows for significant cost savings by reducing resource overhead by sharing the processing of a single system across multiple tenants. A software-as-a-service (SaaS) provider, for example, can run one instance of its application on one instance of a database and provide web access to multiple customers. In such a scenario, each tenant's data is isolated and remains invisible to other tenants.

SUMMARY

The disclosure generally describes computer-implemented methods, computer program products, and systems for providing metadata-driven dynamic load balancing in multi-tenant systems. A computer-implemented method includes: identifying a request related to a model-based application executing in a multi-tenant system associated with a plurality of application servers and identifying at least one object in the model-based application associated with the request. At least one application server is identified as associated with a locally-cached version of a runtime version of the identified object, and a determination of a particular one of the identified application servers to send the identified request for processing is based on a combination of the availability of a locally-cached version of the runtime version at the particular application server and the server's processing load. The request is then sent to the determined application server for processing.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
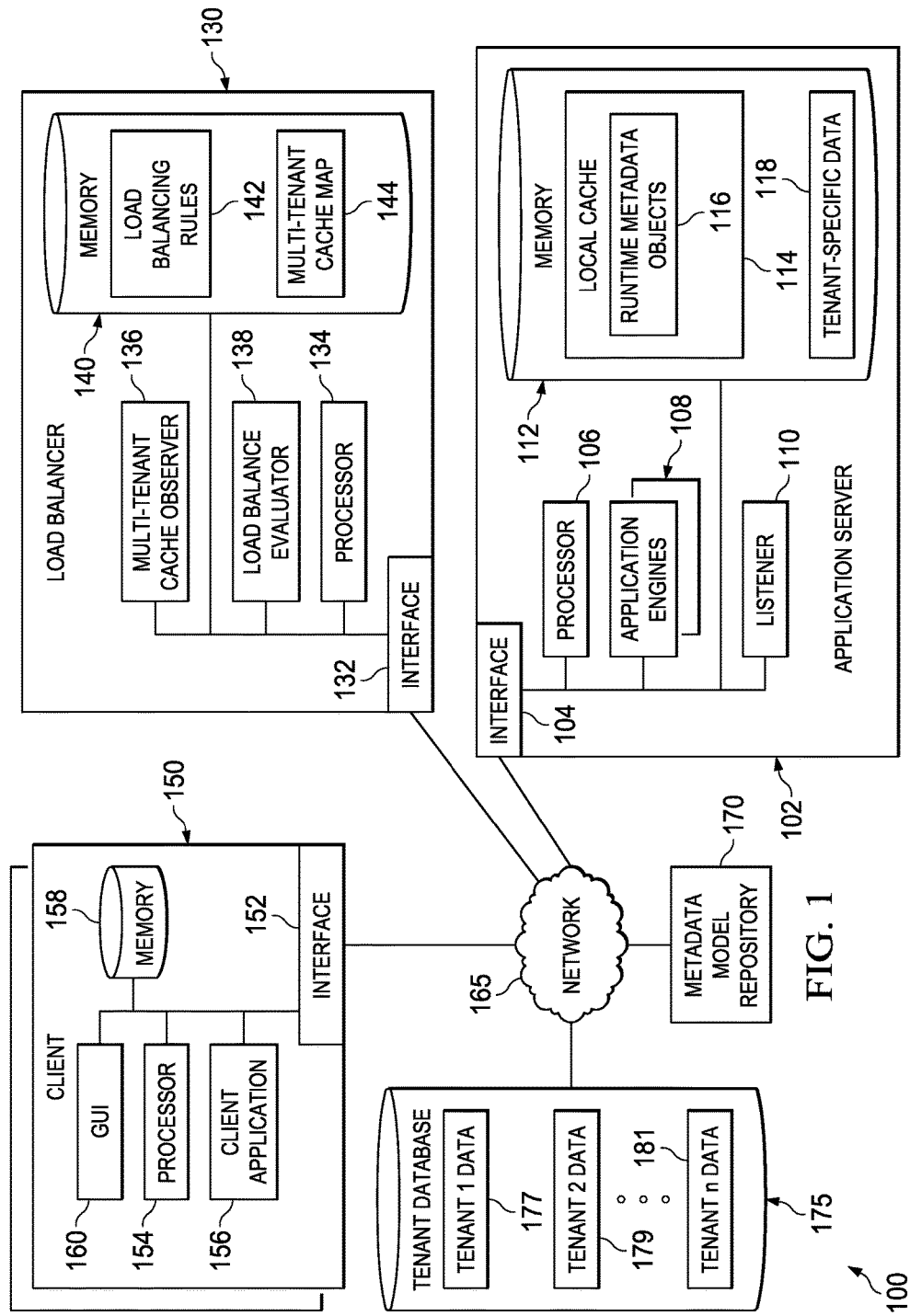
FIG. 1 illustrates an example of a computer system environment for providing metadata-driven dynamic load balancing in multi-tenant systems.

Multi-tenant architecture and infrastructure is a key pillar for the provisioning of software as a service. Sharing an architecturally sound multi-tenant environment offers more ways to guarantee better and more efficient scalability, performance, application management, and software upgrades in such a multi-tenant system. However, in order to fully benefit from a multi-tenant environment, new solutions and approaches for some IT-procedures are necessary. The present disclosure focuses on application server cache management for application loads and application metadata in a model-driven application development. Cache-size parameterization and user sessions/requests-related dispatching to application servers cause large impacts on the performance and scalability of multi-tenant environments. Increasing the ratio of cache hits to cache misses while retaining minimal cache sizes are the principal targets of cache management.

Single tenant environments offer several approaches to achieve this target, although each of these approaches are not leveraged effectively the benefit of multi-tenant environment they are also partially applied to a multi-tenant environment due to lake of new tailored solutions. This disclosure provides a solution for appropriate app-server cache management that is tailored for multi-tenant environment to leverage it effectively.

Several examples demonstrate the challenges related to the application server cache management in the context of a multi-tenant environment. In a first example, cache management is performed at initial setup and a maximum cache size is defined. In one approach, the administrator builds a static size cached needed by all applications that may run on a particular application server. The disadvantage to this approach is that some applications are used less than others, and no effective sharing of memory is provided to reduce the maximum need for the environment. In a second approach to initial setup cache management, one application server may be provided per application or application category with a predefined cache size. In those instances, server-application islands are created which do not benefit fully from a full, multi-tenant environment.

In another example, the initial resources provided to a particular multi-tenant environment can be increased by adding hardware, memory, application servers, and other resources. However, when new resources are added, the respective application servers' caches are initially empty, which in turn leads to additional cache misses (i.e., situations where a request is sent to an application server without cached elements related to the request). Therefore, the cache must be built as soon as possible and with the correct sets of data (i.e., loads, metadata, etc.). In a first approach, additional resources can have new caches built that contain data for all applications that may run on the application server in the future. However, this approach can be timely and resource-intensive to complete, particularly for situations where the fully-built caches may never be used. A second request is to build the caches when a first user request arrives at the new application server. However, this approach fails to provide any optimizations to cache misses, as requests routed to different application servers may cause multiple cache misses and cache builds.

In another example, a new customer tenant can be built with the cache, requiring each end user request to be dispatched to the correct application server. One approach for these systems can be to rely on a customer-dedicated server, although advantages of the scalability of the multi-tenant system are lost or reduced through this method.

Further, with system upgrades and software changes, caches are generally invalidated and must be rebuilt when new requests are received. This situation becomes similar to, and provides the same disadvantages, the present options related to increasing resources by adding application servers to the multi-tenant system.

The present disclosure provides a solution that overcomes the deficiencies of the current solutions. Specifically, the systems and methods described herein leverage the combination of user-specific metadata and runtime engine-specific metadata to determine the metadata needed to fulfill current and subsequent user requests. Once the metadata needed is determined, a cross-application server cache map is used to determine one or more application servers that can potentially provide the highest likelihood of a cache hit based on that knowledge. User request are then routed to one of those determined servers. In some instances, the application servers can be ranked based on their relatively likelihoods of success based on their current caches. Additionally, the current load upon those application servers can be used to further determine which of the application servers should receive the request. For example, if two application servers are closely matched based on their relative caches related to the user request, the application server with the smaller current and/or expected load can be selected to receive the user request. A suitable weighting algorithm can be applied in such situations, providing a consideration of user metadata, cross-application server caching, and server load for each request.

Based on user metadata, the particular object models that have to be processed by the different application engines to fulfill an end user request can be determined in advance. For example, an assigned work center associated with a user and that user's request can determine that object models related to that particular work center are needed, such as user interfaces and/or business objects, lists, and/or analytical reports, among others. By comparing the needed objects models to process a user request and potential subsequent requests with already built caches on the different application servers, a "best cache hits" strategy can be calculated and used to determine one or more application servers for which the user request is best suited. In some instances, the particular load on those determined application servers can be used to assist in providing a load balanced "best cache hits" strategy. The user request can then be dispatched to the application server with the more accurate cache, or, in other instances, with one of the more accurate caches and the best load characteristics for handling the request.

The multi-tenant environment is enriched with a multi-tenant cache observer component that interacts with a metadata repository, application servers, and the load balancer. The load balancer can inform the cache observer about incoming user requests. In turn, the cache observer interacts with the metadata repository to determine the needed metadata and loads for the runtime application engines. When that metadata is determined, the cache observer compares cache need with the already available caches on the different application servers by consulting the up-to-date cache map. A list of ranked application servers (based on relative cache-match) is provided to the load balancer, which can then merge the information with its respective load balancing algorithm to determine the application server to which the user request is to be dispatched. The cache map maintained by the cache observer can be updated by having the application servers communicate updates to their cache to the cache observer.

FIG. 1 illustrates an example a computer system environment 100 for providing metadata-driven dynamic load balancing in multi-tenant systems. Specifically, the illustrated environment 100 includes or is communicably coupled with one or more clients 150, one or more application servers 102, a load balancer 130, a metadata model repository 170, a tenant database 175, and a network 165.

In general, each application server 102 is a server that executes one or more application engines 108 in a multi-tenant environment. Each application server 102 can receive one or more user requests sent from a particular client 150, where the user requests are initially routed to the load balancer 130 and then provided to a particular application server 102 best matching the requirements of the request. Each application server 102 can interact with clients 150, the load balancer 130, and any other components within and communicably coupled to the illustrated environment 100 of FIG. 1. In some implementations, the application server 102 may store and execute a plurality of application engines 108, as well as other types of applications or operations. In other implementations, the application server 102 may be a dedicated server meant to store and execute only application engines 108 associated with a particular multi-tenant environment 100. In some instances, different application engines 108 across a plurality of application servers 102 may be dedicated to specific tasks, while in other instances, at least some of the application engines 108 executing in one application server 102 can perform the same operations as one or more application engines 108 in another application server 102. In some implementations, the application server 102 may comprise a Web server, where the application engines 108 represent one or more Web- or cloud-based engines or applications accessed and executed in response to client requests in the multi-tenant environment 100, the requests received via the network 165 or directly at the application server 102.

At a high level, each application server 102 comprises an electronic computing device operable to receive, transmit, process, store, or manage data and information associated with the environment 100. Specifically, the application server 102 illustrated in FIG. 1 is responsible for receiving user requests from the load balancer 130 and subsequently performing the operations associated with the request. In addition to requests from the external clients 150, requests may also be sent from internal users, other external or third-party customers, other automated applications, as well as any other appropriate entities, individuals, systems, or computers.

As used in the present disclosure, the term "computer" is intended to encompass any suitable processing device. For example, although FIG. 1 illustrates a single application server 102, environment 100 can be implemented where each application server 102 is composed of two or more such servers, as well as computers other than servers, including a server pool. Indeed, each application server 102 may be any computer or processing device such as, for example, a blade server, general-purpose personal computer (PC), Mac®, workstation, UNIX-based workstation, or any other suitable device. Different application servers 102 may be implemented with different hardware and/or software in some instances. In other words, the present disclosure contemplates computers other than general purpose computers, as well as computers without conventional operating systems. Further, the application servers 102 may be adapted to execute any operating system, including Linux, UNIX, Windows, Mac OS®, Java™, Android™, iOS or any other suitable operating system. According to one implementation, one or more of the application servers 102 may also include or be communicably coupled with an e-mail server, a Web server, a caching server, a streaming data server, and/or other suitable server or computer.

In the present illustration, each application server 102 includes the application engines 108 and a listener 110. The application engines 108 perform the operations described above, while the listener 110 is a component used to keep a multi-tenant cache map 144 (managed by a multi-tenant cache observer 136) up-to-date in response to one or more modifications to local cache 114 associated with each application server 102. The listener 110 may automatically provide information to the cache observer 136 in response to changes to the local cache 114, while in others, the listener 110 may periodically survey the local cache 114 to determine if changes have occurred, and, if so, can then provide those to the cache observer 136. The listener 110 may be a remote component of the cache observer 136, as well as any other suitable software and/or hardware.

As illustrated, the application server 102 includes an interface 104, a processor 106, and a memory 112. The interface 104 is used by the application server 102 for communicating with other systems in a distributed environment—including within the environment 100—connected to the network 165 including, for example, clients 150, the load balancer 130, any of the other illustrated components, as well as other systems communicably coupled to the network 165 (not illustrated). Generally, the interface 104 comprises logic encoded in software and/or hardware in a suitable combination and operable to communicate with the network 165. More specifically, the interface 104 may comprise software supporting one or more communication protocols associated with communications such that the network 165 or the interface's hardware is operable to communicate physical signals within and outside of the illustrated environment 100.

As illustrated in FIG. 1, the application server 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the application server 102. Specifically, the processor 106 executes the functionality required to receive and respond to requests from the various devices, including the execution of the one or more application engines 108 and the listener 110.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The application server 102 includes a memory (or multiple memories) 112. The memory 112 may include any type of memory or database module and may take the form of volatile and/or non-volatile memory including, without limitation, magnetic media, optical media, random access memory (RAM), read-only memory (ROM), removable media, or any other suitable local or remote memory component. The memory 112 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto. Additionally, the memory 112 may include any other appropriate data, such as VPN applications, firmware logs and policies, firewall policies, a security or access log, print or other reporting files, as well as others. In particular, illustrated memory 112 includes a local cache 114 and a set of tenant-specific data 118.

The local cache 114 stores cached runtime versions and/or artifacts used of one or more model-driven applications. Model-driven applications can be defined by developers in a modeling environment, with a plurality of meta-model information defining the applications stored within the system, such as within the metadata model repository 170. To execute the applications, however, a runtime version of those defined models need to be compiled or otherwise generated in order to provide an execution environment for the applications. Once compiled, runtime versions and/or artifacts of the model-based application are available and can be used to execute operations associated with the underlying applications. Such runtime versions may have many names, and will herein be referred to as runtime metadata objects. As illustrated the local cache 114 of each application server 102 can include or be associated with one or more of these runtime metadata objects 116 that are created when the model-based application is instantiated and/or executed on a particular application engine 108 within the application server 102. In some instances, creating these runtime metadata objects 116 can be relatively time-consuming and/or resource-intensive, such that initial requests to the application server 102 for a previously un-compiled model application or artifact can result in delayed execution and reduced resources, as the requested models of the model-based application must be compiled prior to execution. Therefore, the solution of the present disclosure provides mechanisms for providing the load balancer 130 with information on which application servers 102 include a cached version of particular model application components (i.e., the runtime metadata objects 116). When the load balancer 130 receives a user request, the system can determine which systems have already compiled and/or have available at least some objects 116 relevant to the request, and use such information to send the request to an appropriate application server 102. As the local cache 114 is modified, listener 110 can update the system (i.e., the cache observer 136) with the local cache 114 changes. When this is done by a plurality of application servers 102, the load balancer 130 may be able to avoid sending user requests to application servers 102 where the needed runtime objects must be compiled or otherwise initialized, and can instead send the requests to systems where those objects are already available.

Memory 112 is also illustrated as including a set of tenant-specific data 118. In some instances, information particular to one or more tenants may be stored locally at memory 112 when processing for those tenants is being performed. In other instances, such information may be stored remotely from the individual application servers 102, and, in some instances, centrally to the overall system. As illustrated in FIG. 1, a tenant database 175 may include tenant-relevant data 177, 179, 181 for a plurality of tenants associated with the multi-tenant environment 100.

The load balancer 130 in FIG. 1 represents an initial receiver of user requests sent from one or more clients 150 associated with the multi-tenant system 100. In systems prior to the present solution, load balancers traditionally receive user requests and evaluate relative loads on the plurality of application servers (and/or their respective application engines) in a multi-tenant environment, directing the request to the application server and/or application engine with the best-available set of processing power for processing the user request. As described above, such systems have various deficiencies, including the fact that such load balancers cannot evaluate whether the caches of the application servers to which requests are sent include the content and artifacts needed, or whether such runtime objects must be recompiled or generated in order to process the user request.

In the present system, however, the load balancer 130 represents an enhanced load balancer system, allowing the load balancer 130 to consider both the relative loads of the respective application servers 102 and application engines 108 in the multi-tenant system and the available caches (and their available runtime artifacts) on different application servers 102. In some instances, the load balancer 130 may be its own server or computing system, while in others it may be associated with one or more of the application servers 102 associated with the multi-tenant system 100. The load balancer 130 includes several components, including the multi-tenant cache observer 136 and a load balance evaluator 138. To interact with the network 165, receive the user requests, and to correspond with the other connected systems, the load balancer 130 includes interface 132 (which may be similar to or different from interface 104). The load balancer 130 also includes memory 140, which may be similar to or different from memory 112. To execute its various processes, the load balancer 130 includes processor 134, which performs the functionality associated with the cache observer 136 and the load balance evaluator 138.

The cache observer 136 enables the load balancer 130 to have an overview regarding available caches on the application servers 102 throughout the multi-tenant environment 100. While illustrated within the load balancer 130, the cache observer 136 may be deployed on a different server or system as the load balancer 130 in other implementations. The cache observer 136 maintains the multi-tenant cache map 144 which collects local cache 114 information from each of the connected application servers 102. The cache map 144 remains up-to-date across the system 100, receiving and/or retrieving information on cache creations, updates, or invalidations executed on various application servers 102. As noted early, the listeners 110 located at the respective application servers 102 can provide this information to the cache observer 136, which in turn updates the cache map 144. Other suitable means of keeping the cache map 144 remaining updated may also be used, where appropriate.

When user requests are received, the cache observer 136 can also interact with the metadata model repository 170 to determine what types of runtime objects will be needed to fulfill the received user request. Using information on the underlying model of the associated modeled application, the cache observer 136 can determine the various models and modeling artifacts will be needed to initially execute the request, as well as such models and artifacts that may be needed to perform related requests. For instance, if the request relates to the creation of a sales order, the cache observer 136 may identify the UI screens and runtime objects that are used in creating the sales orders as what is needed immediately to process the request. In addition, the cache observer 136, based on the underlying model in the metadata model repository 170, may identify one or more likely objects that are possibly needed for related processes, such as sales order confirmations, cancellations, and approval. The cache observer 136 can then use this information to assist the load balancer 130 in determining appropriate locations to send the user request.

Once the set of needed runtime objects is determined, the cache observer 136 uses the cache map 144 to identify where the needed objects can be found in the already available local caches 114 of the available application servers 102. Based on this information, the cache observer 136 can provide a ranked list of application servers 102 to the load balancer 130 identifying one or more suitable application servers 102 to which to send the user request. In some instances the cache observer 136 can rank the identified one or more suitable application servers 102 to identify which may be best suited to receive the user request based on the respective local cache 114. Additionally or alternatively, a relative score or rank may be associated with each of the identified application servers 102.

The load balance evaluator 138 can use the findings of the cache observer 136 to choose to which application server 102 to send the received user request. As illustrated in memory 140, a set of load balancing rules 142 may be used to effect this decision. These rules may provide algorithms that weigh the assessment received from the cache observer 136 with the relative processing loads at each application server 102. In some instances, the local cache 114 of a particular application server 102 may so match the user request that the relative load of the particular application server 102 is viewed as irrelevant, such that the user request is always sent to the application server 102 regardless of its current load. In other instances, where two or more application server's local caches 114 are relatively equal matches to each other, the application server 102 with the least load may be selected to receive the user request. Another simple dispatching algorithm could be to dispatch user requests to the application server 102 with the best suitable local cache 114 where the application server's relative load is less than 50%. Additionally, application servers 102 with loads greater than 90% may not be considered as targets for dispatching even if their local cache 114 matches the user request best. Any number of possible algorithms may be used for the load balancing rules 142 and applied by the load balancer evaluator 138. Once the particular application server 102 to be used is identified, the user request is sent to the appropriate application server 102.

Network 165 facilitates wireless or wireline communications between the components of the environment 100 (i.e., between the application server 102, the load balancer 130, and clients 150), as well as with any other local or remote computer, such as additional clients, servers, or other devices communicably coupled to network 165, including those not illustrated in FIG. 1. In the illustrated environment, the network 165 is depicted as a single network, but may be comprised of more than one network without departing from the scope of this disclosure, so long as at least a portion of the network 165 may facilitate communications between senders and recipients. In some instances, one or more of the components associated with the application server 102 may be included within network 165 as one or more cloud-based services or operations. For example, at least a portion of the application server 102 and/or the load balancer 130 may be within the network 165, and operated at least partially within a cloud-based system. The network 165 may be all or a portion of an enterprise or secured network, while in another instance, at least a portion of the network 165 may represent a connection to the Internet. In some instances, a portion of the network 165 may be a virtual private network (VPN). Further, all or a portion of the network 165 can comprise either a wireline or wireless link. Example wireless links may include 802.11a/b/g/n, 802.20, WiMax, LTE, and/or any other appropriate wireless link. In other words, the network 165 encompasses any internal or external network, networks, sub-network, or combination thereof operable to facilitate communications between various computing components inside and outside the illustrated environment 100. The network 165 may communicate, for example, Internet Protocol (IP) packets, Frame Relay frames, Asynchronous Transfer Mode (ATM) cells, voice, video, data, and other suitable information between network addresses. The network 165 may also include one or more local area networks (LANs), radio access networks (RANs), metropolitan area networks (MANs), wide area networks (WANs), all or a portion of the Internet, and/or any other communication system or systems at one or more locations.

The illustrated environment of FIG. 1 also includes the one or more clients 150. Each client 150 may be any computing device operable to connect to or communicate with at least the load balancer 130 and/or the application servers 102 via network 165 using a wireline or wireless connection. In general, each client 150 comprises an electronic computer device operable to receive, transmit, process, and store any appropriate data associated with the environment 100 of FIG. 1.

The illustrated client 150 includes an interface 152, a processor 154, and a memory 158. The interface 152 is used by the client 150 for communicating with other systems in a distributed environment—including within the environment 100—connected to the network 165, as well as other systems communicably coupled to the network 165 (not illustrated). Generally, the interface 152 comprises logic encoded in software and/or hardware in a suitable combination and operable to communicate with the network 165. More specifically, the interface 152 may comprise software supporting one or more communication protocols associated with communications such that the network 165 or interface's hardware is operable to communicate physical signals within and outside of the illustrated environment 100.

As illustrated in FIG. 1, each client 150 includes a processor 154. Although illustrated as a single processor 154 in FIG. 1, two or more processors may be used according to particular needs, desires, or particular implementations of the environment 100. Each processor 154 may be a central processing unit (CPU), an application specific integrated circuit (ASIC), a field-programmable gate array (FPGA), or another suitable component. Generally, the processor 154 executes instructions and manipulates data to perform the operations of the client 150. Specifically, the processor 154 executes the functionality required to send requests to the load balancer 130 and/or application server 102 and to receive and process responses from the same, as well as to execute the client application 156 and its associated functionality.

Further, the illustrated client 150 includes a graphical user interface (GUI) 160. The GUI 160 interfaces with at least a portion of the environment 100 for any suitable purpose, including generating a visual representation of a Web browser, which can in turn present information associated with the client application 156. In particular, the GUI 160 may be used to view and navigate various Web pages and/or application pages both associated with and unrelated to the application servers 102. The GUI 160 associated with each client 150 may comprise a graphical user interface operable to, for example, allow the user of a client 150 to interface with at least a portion of the modeled application and its associated operations and functionality, as well as other applications. Generally, the GUI 160 provides the particular user with an efficient and user-friendly presentation of business data provided by or communicated within the system. The GUI 160 may comprise a plurality of customizable frames or views having interactive fields, pull-down lists, and buttons operated by the user. For example, the GUI 160 may provide interactive elements that allow a user to interact with a multi-tenant application, as well as other components within and/or external to environment 100. The different portions of the extendible application model system's functionality may be presented and accessible to the user through the GUI 160, such as through the client application 156. Generally, the GUI 160 may also provide general interactive elements that allow a user to access and utilize various services and functions of one or more applications. The GUI 160 may present information associated with the client application 156 for viewing and interaction. In general, the GUI 160 is often configurable, supports a combination of tables and graphs (bar, line, pie, status dials, etc.), and is able to build real-time portals, where tabs are delineated by key characteristics (e.g., site or micro-site). Therefore, the GUI 160 contemplates any suitable graphical user interface, such as a combination of a generic web browser, intelligent engine, and command line interface (CLI) that processes information in the platform and efficiently presents the results to the user visually.

The illustrated client 150 also includes a memory 158. The memory 158 may include any memory or database module and may take the form of volatile or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 150. Additionally, the memory 158 may include any other appropriate data, such as VPN applications, firmware logs and policies, firewall policies, a security or access log, print or other reporting files, as well as others.

The illustrated client 150 further includes a client application 156. The client application 156 is any type of application that allows the client 150 to request and view content on the client 150. In some implementations, the client application 156 can be and/or include a Web browser. In some implementations, the client-application 156 can use parameters, metadata, and other information to send requests to the multi-tenant environment 100, and specifically, to the load balancer 130 and its associated application servers 102. Further, although illustrated as a single client application 156, the client application 156 may be implemented as multiple client applications in the client 150. In some instances, the client application 156 may be an agent or client-side version of the one or more model-based applications executing within the multi-tenant environment 100.

There may be any number of clients 150 associated with, or external to, the environment 100. For example, one or more clients 150 may be associated with environment 100. Additionally, there may also be one or more additional clients 150 external to the illustrated portion of environment 100 that are capable of interacting with the environment 100 via the network 165. Further, the term "client" and "user" and "administrator" may be used interchangeably as appropriate without departing from the scope of this disclosure. Moreover, while the client 150 is described in terms of being used by a single user, this disclosure contemplates that many users may use one computer, or that one user may use multiple computers.

The illustrated client 150 is intended to encompass any computing device such as a desktop computer, laptop/notebook computer, wireless data port, smart phone, personal data assistant (PDA), tablet computing device, one or more processors within these devices, or any other suitable processing device. For example, the client 150 may comprise a computer that includes an input device, such as a keypad, touch screen, or other device that can accept user information, and an output device that conveys information associated with the operations of the multi-tenant environment and its modeled applications or the client 150 itself, including digital data, visual information, or the GUI 160, as shown with respect to the client 150.

FIG. 1 is meant to be an example implementation, and may include additional, fewer, different, or alternative components as compared to those illustrated herein. Some components may be combined, or their individual functionalities may be separated into multiple components. The illustrated implementation is not meant to be limiting, but instead one of many possibilities based on the descriptions herein.

Figure 2A:
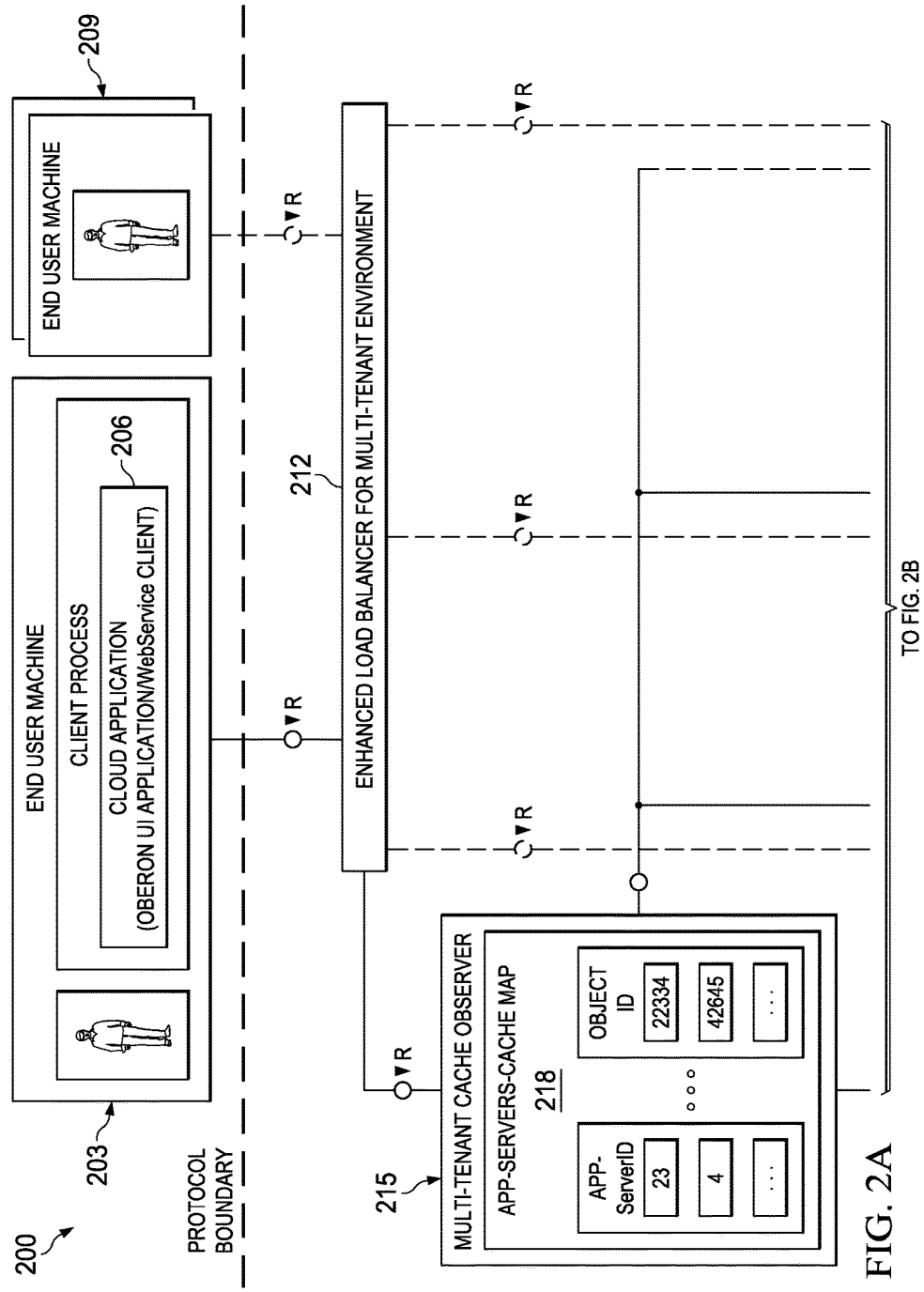
FIGS. 2A-2B illustrate a diagram of another example environment for providing metadata-driven dynamic load balancing in multi-tenant systems.
Figure 2B:
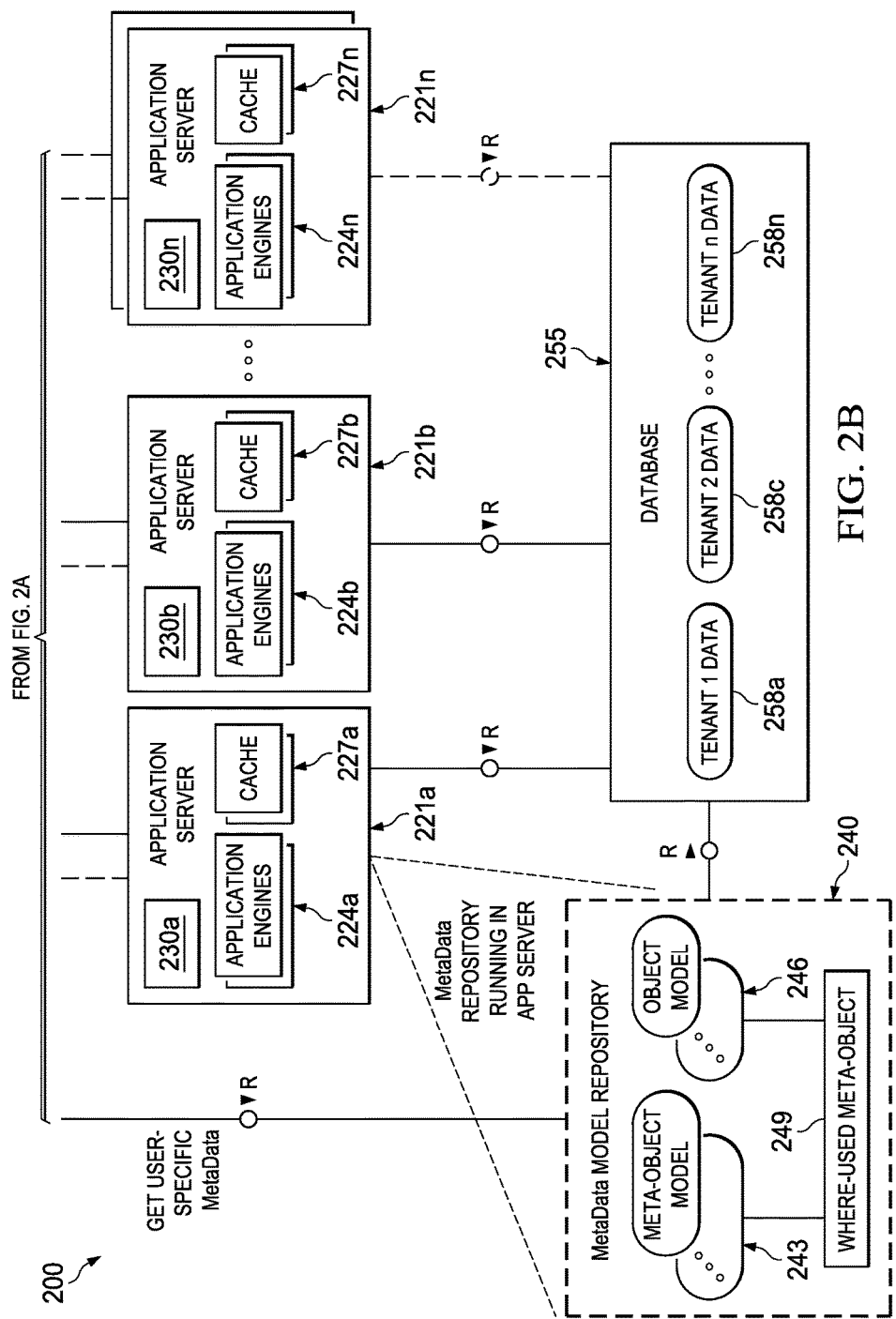

FIGS. 2A-2B illustrate a diagram of another example environment 200 for providing metadata-driven dynamic load balancing in multi-tenant systems. Several of the elements in FIGS. 2A-2B may be similar to or different from those described in FIG. 1. Various implementations of the metadata-driven dynamic load balancing intended for the present disclosure, and FIGS. 2A-2B represent one possible implementation.

FIGS. 2A-2B include end user machines 203 and 209, an enhanced load balancer 213, a multi-tenant cache observer 215, three example application servers 221a-c, a metadata model repository 240, and a database 255. The end user machines 203, 209 send, using the cloud application 206 on end user machine 209, for example, one or more user requests to the multi-tenant system. The user requests are initially received at the enhanced load balancer 212. The load balancer 212 then provides the user request to the cache observer 215 for processing.

The cache observer 215 performs several operations in environment 200. First, the cache observer 215 uses the user request and its related metadata to identify, from the metadata model repository 240, one or more runtime metadata artifacts needed to process the user request and, in some instances, one or more related operations that may later be requested after the first user request.

The metadata model repository 240 stores information related to the model-driven application executed in the multi-tenant environment 200. In a model-driven application development infrastructure, development entities are presented as design time artifacts stored and administered in the metadata model repository 240. The relationships of those entities are defined in the repository 240, and can be used to determine which development artifacts are involved with or need to be processed in response to a particular user request (e.g., based on information in the user request itself, the particular requesting user, etc.).

The metadata model repository 240 is illustrated as including three components, a meta-object model 243, an object model 246, and a where-used meta-object 249. The meta-object model 243 includes business objects, communication interfaces, user interfaces, and other objects. The meta-object model 243 provides descriptions of various object models 246 used in the particular multi-tenant environment 200. Particular instances of meta-object models are object models, such as a business partner object model or a sales order business object model. The meta-object model 243 and object models 246 are compiled into runtime objects or artifacts for runtime execution. The where-used meta-object 249 provides descriptions and information on where particular meta-objects and objects are used within an application. Using the where-used meta-object 249, the locations of where a particular object is associated can be identified, the dependencies with one or more other meta-objects can be defined, and the current or previous instantiated versions of particular meta-objects can be determined. In some instances, the users or clients who have recently or are currently using a particular meta-object can be identified.

The cache observer 215 can determine one or more objects associated with the user request, and in some instances, the user providing the request. Once that information is collected, the cache observer 215 can then determine one or more of the application servers 221 have associated runtime objects within their local caches 227. Specifically, the cache observer 215 can maintain a cache map 218 describing the current contents of local caches 227 within each of the application servers 221 associated with the respective application servers 102. The cache map 218 can provide a real-time, up-to-date view of the current local cache 227 statuses throughout the application servers 221 to determine which of the application servers 102 may have available one or more of the objects needed or associated with the received user request. In some instances, listeners 230a-n located at each application server 221 can provide the cache observer 215 with up-to-date information when any changes occur at the local caches 227. In some instances, the listeners 230 may provide a notice of the change, but not the changes themselves. The cache observer 215 can then access the local caches 227 to determine the specific changes and update the cache map 218.

Using the cache map 218, the cache observer 215 can determine which application server 221 have at least some of the needed runtime objects associated with the user request, and can generate a list of suitable application servers 221 to which the user request can be sent. In some instances, the cache observer 215 can provide a ranked or otherwise relatively evaluated list of application servers 221, where the list provides a comparison of the relative quality of the suitability of the application servers 221. For example, if two application servers 221 each have caches with a version of a first runtime object required to immediately fulfill the request, but one of the application servers 221 includes a runtime version of an object that may be needed for optional additional processing, the application server 221 with the optional runtime object may be ranked or otherwise rated relatively higher than the other server 221.

The list of suitable application servers 221 can then be provided back to the enhanced load balancer 212. The load balancer 212 can then use its own load balancing rules and algorithms to determine, based, at least in part, on the information from the cache observer 215. The relative processing loads on each of the application servers 221 and their respective application engines 224*a-n* can also be factored into the load balancing algorithm, such that the combination of load and cache considerations can be included in a dispatching strategy. In some instances, input related to available cache information is retrieved via a dedicated call to the cache observer 215. Sample algorithms are provided above in relation to the description of load balance evaluator 138 of FIG. 1. Similar algorithms, as well as more or less sophisticated algorithms, may be implemented in the illustrated system. The load balancer 212 can forward the received user request upon selecting a particular application server 221 for processing, where that application server 221 can process the request using its respective one or more application engines 224, and can respond to the requesting application 206. Correspondence to and from the load balancer 212 and application servers 221 and other components can be performed via remote function call (RFC), Hypertext Transfer Protocol (HTTP), HTTP Secure (HTTPS), or any other suitable protocol.

FIGS. 2A-2B also include database 255 which stores the tenant-specific data 258*a-n* associated with each of the tenants in the multi-tenant system 100. As the tenant-specific information is stored separately, multiple tenants can benefit from the cache/load algorithms of the load balancer 212 without risking the sharing or insecurity of their tenant-specific data.

Figure 3:
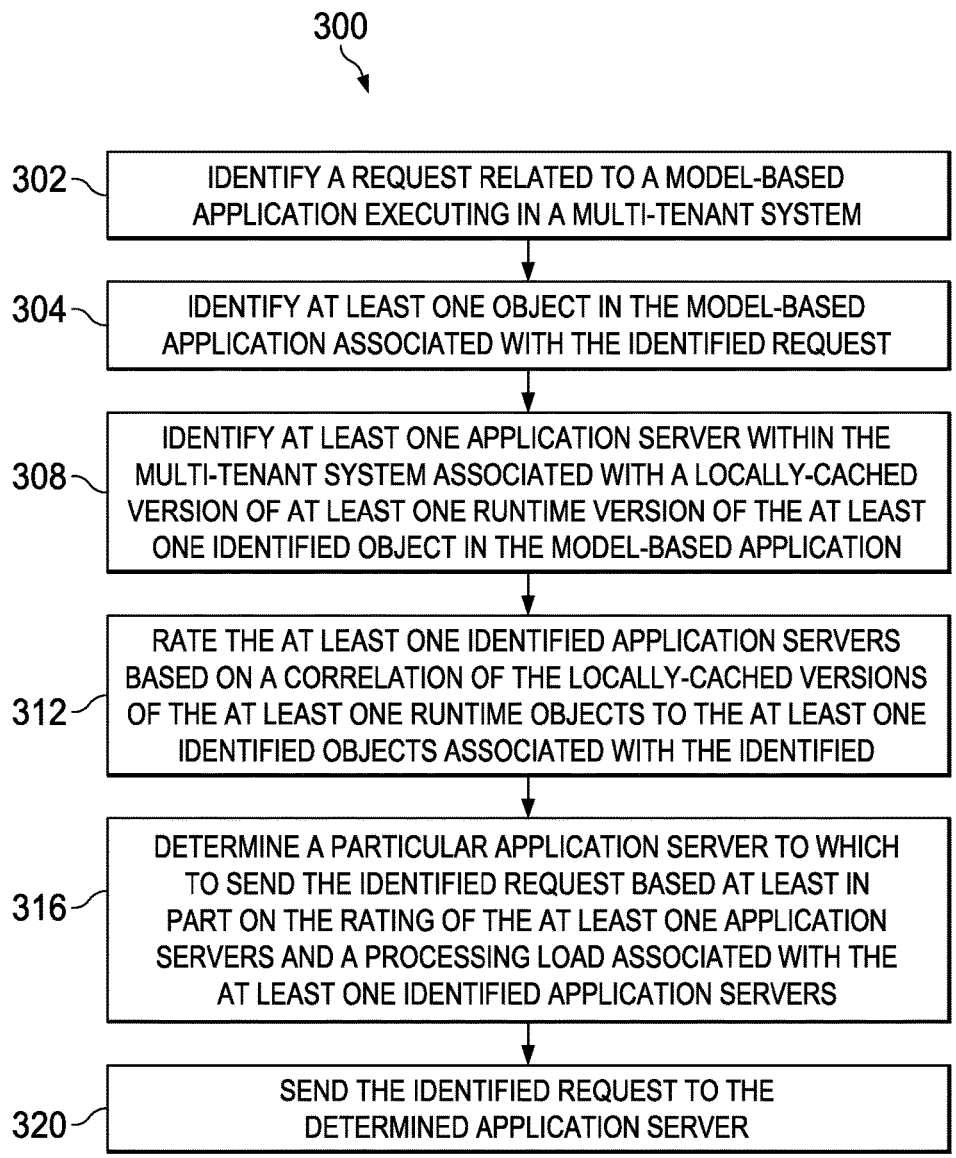
FIG. 3 illustrates an example method for providing metadata-driven dynamic load balancing in multi-tenant systems.

FIG. 3 illustrates an example method 300 for providing metadata-driven dynamic load balancing in multi-tenant systems. For clarity of presentation, the description that follows generally describes method 300 in the context of FIG. 1. However, it will be understood that method 300 may be performed, for example, by any other suitable system, environment, software, and hardware, or a combination of systems, environments, software, and hardware, as appropriate.

At 302, a request related to a model-based application executing in a multi-tenant system or environment is identified. In some instances, the request may be received at a load balancer associated with the multi-tenant system. The load balancer can determine a particular application server from a plurality of application servers to which the request should be routed or provided. Specifically, the particular application server can be determined based on the relative loads of each of the application servers in combination with a determination of which application servers have the most relevant runtime objects or other runtime artifacts available in their local caches at the time of the request.

At 304, at least one object in the model-based application associated with the identified request is identified or otherwise determined. The determination of which objects related to or are associated with the identified request can be based on the request itself (i.e., "Create a new sales order"), information associated with a user or system initiating the request, or any other suitable request-related information. The determination of which objects are related to the request can be based on a metadata repository defining the model-based application. The model-based application can be defined by one or more models which model specific entities in the application, as well as their relationship to one or more other entities and/or models. Using the metadata repository and its modeled content, the particular objects associated with the identified request can be identified. In some instances, the identified objects may be related both to the immediate request received and to one or more related objects that are not immediately needed to fulfill the request, but which may be needed as the request is processed and additional, related and subsequent requests are received.

The objects identified at 304 are generally design time objects, where, for the application to be executed, a corresponding runtime version of the particular design time objects must be generated or compiled. When the application servers execute the model-based application, the design time objects are compiled into executable runtime objects, which are then executed along with tenant-specific data in response to user requests. Those runtime objects are then stored in a local cache at the application server in which they are associated.

At 308, at least one application server within the multi-tenant system is identified as being associated with a locally-cached version of at least one runtime version of the at least one identified objects. The application server local caches are reviewed to determine which application servers include the runtime objects corresponding to the objects identified at 304. In some instances, including those described in FIGS. 1 and 2, a cache map may be generated at a centralized location which collects and update cache information and provides an up-to-date listing of each local cache of each application server in the multi-tenant system. The cache map can be consulted to determine the particular runtime objects available in each local cache. In some instances, the local cache may identify its particular objects by an identifier, where the runtime identifier of the particular object corresponds to a design time object identifier, providing a simple correlation between the identified objects related to the identified request and the objects located in the application servers' local caches.

At 312, the at least one application servers are rated based on a correlation between the locally-cached runtime objects available at each application server and the at least one identified objects associated with the request. The rating may provide a numerical value, a relative ranking, or any other suitable and comparable values. In some instances, a ranked or ordered list may be prepared and used. Any suitable rating or ranking system may be used. Ratings may be based on immediately needed objects for responding to the request, as well as objects that may be needed in subsequent possible requests or operations that may occur in response to the initial request.

At 316, a particular application server to which the identified request is to be sent is determined, where the determination is based, at least in part, on the rating of application servers (from 312) and on the processing loads of each of the identified application servers. Any suitable algorithm can be applied at 316. For example, a simple example algorithm is to dispatch the identified request to a particular application server that is the highest ranked while having a current processing load of less than 50%. Additionally, application servers with processing loads greater than 90% may not be considered as targets for sending the request even if their local caches represent the highest rated of the caches. Other more sophisticated algorithms may be implemented in alternative examples. The algorithms applied can be determined by a systems administrator or other suitable entity. At 320, the identified request is sent to the application server as determined by 316.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environments 100 and 200 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, the method executed by one or more processors, the method comprising:
    identifying, at a load balancer, a request related to a model-based application executing in a multi-tenant system, wherein the multi-tenant system associated with a plurality of application servers, and wherein the load balancer manages routing of identified requests related to the model-based application to particular application servers in the multi-tenant system;
    identifying, by the load balancer, at least one object in the model-based application associated with the identified request, wherein identifying the at least one object includes accessing a metadata repository associated with the model-based application to identify one or more design time objects associated with the identified request;
    accessing, by the load balancer, a multi-tenant cache map storing information defining a current status of local caches of each of the plurality of application servers in the multi-tenant system maintained by the load balancer, wherein the multi-tenant cache map collects local cache information from each of the plurality of application servers in the multi-tenant system and identifies at least the locally-cached runtime versions of objects available in the corresponding local cache of the particular application servers;
    identifying, by the load balancer using the multi-tenant cache map, at least two application servers from the plurality of application servers based on a determination that each of the at least two application servers includes, at a time the request is identified, a locally-cached version of at least one runtime version of the at least one identified object in the model-based application based on the current status of the local caches of the at least two application server as defined in the multi-tenant cache map; and
    in response to identifying the at least two application servers, determining, by the load balancer, a particular application server from the at least two application servers to send the identified request for processing based at least in part on a combination of the locally-cached version of the at least one runtime version being available at the particular application server and the relative processing load of the particular application server as compared to the other application servers in the at least two identified application servers; and
    sending, by the load balancer, the identified request to the determined particular application server for processing.

2. The method of claim 1, wherein determining the particular application server from the at least two application servers to send the identified request for processing includes:
    ranking the at least two application servers based on a correlation of the locally-cached versions of the at least one runtime objects to the at least one object associated with the identified request; and
    in response to a determination that each of the at least two application servers includes a locally-cached version of the at least one runtime version of the at least one identified object:
        identifying a second object in the model-based application associated with the identified request, the second object being different than any of the identified at least one object; and
        ranking the at least two application servers based on a correlation of the locally-cached versions of the at least one runtime objects to the second object associated with the identified request.

3. The method of claim 2, wherein determining the particular application server from the at least two application servers to send the identified request for processing is based, at least in part, on a relatively higher ranking of the particular application server as compared to the other application servers of the at least two application servers.

4. The method of claim 1, wherein the cache map includes information on the local cache of each application server, where each local cache stores each runtime object available at the respective application server.

5. The method of claim 4, wherein the cache map is updated in response to changes to any local cache of any of the application servers associated with the multi-tenant system, wherein the cache map is updated by receiving updates on changes to the local caches associated with the plurality of application servers from listeners located at and executed by each application server, wherein each listener monitors and provides updated local cache information to the load balancer in response to changes to the local cache of the listener's respective application server.

6. The method of claim 1, wherein identifying the at least one object in the model-based application associated with identified request includes:
    identifying at least one object required to respond to the identified request; and
    identifying at least one object associated with at least one potential operation to be performed subsequent to the initial response to the identified request.

7. The method of claim 6, wherein identifying the at least one object associated with at least one potential operation to be performed subsequent to the initial response to the identified request is based on a relationship of the at least one object associated with the at least one potential object to the at least one identified object required to respond to the identified request within the model-based application.

8. The method of claim 1, wherein the determination of the particular application server to send the identified request for processing is based on an algorithm weighing availability of locally-cached versions of the at least one runtime version at each of the application servers and the relative processing load of each application server.

9. The method of claim 1, wherein identifying the at least one object in the model-based application associated with the identified request is based, at least in part, on the identity of a user associated with request.

10. A computer program product, the computer program product comprising computer-readable instructions embodied on non-transitory media, the instructions operable when executed by at least one computer to:
- identify, at a load balancer, a request related to a model-based application executing in a multi-tenant system, the multi-tenant system associated with a plurality of application servers, and wherein the load balancer manages routing of identified requests related to the model-based application to particular application servers in the multi-tenant system;
- identify, by the load balancer, at least one object in the model-based application associated with the identified request, wherein identifying the at least one object includes accessing a metadata repository associated with the model-based application to identify one or more objects associated with the identified request;
- access, by the load balancer, a multi-tenant cache map storing information defining a current status of local caches of each of the plurality of application servers in the multi-tenant system maintained by the load balancer, wherein the multi-tenant cache map collects local cache information from each of the plurality of application servers in the multi-tenant system and identifies at least the locally-cached runtime versions of objects available in the corresponding local cache of the particular application servers;
- identify, by the load balancer using the multi-tenant cache map, at least two application servers from the plurality of application servers based on a determination that the at least two application servers include, at a time the request is identified, a locally-cached version of at least one runtime version of the at least one identified object in the model-based application as determined based on the current status of the local caches of the at least two application servers as defined in the multi-tenant map; and
- in response to identifying the at least two application servers, determine, by the load balancer, a particular application server from the at least two application servers to send the identified request for processing based at least in part on a combination of the locally-cached version of the at least one runtime version being available at the particular application server and the relative processing load of the particular application server as compared to the other application servers in the at least two identified application servers; and
- send, by the load balancer, the identified request to the determined particular application server for processing.

11. The computer program product of claim 10, wherein determining the particular application server from the at least two application servers to send the identified request for processing includes:
- ranking the at least two application servers based on a correlation of the locally-cached versions of the at least one runtime objects to the at least one object associated with the identified request.

12. The computer program product of claim 11, wherein determining the particular application server from the at least two application servers to send the identified request for processing is based, at least in part, on a relatively higher ranking of the particular application server as compared to the other application servers.

13. The computer program product of claim 10, wherein identifying the at least one object in the model-based application associated with identified request includes accessing a metadata repository associated with the model-based application to identify one or more design time objects associated with the identified request.

14. The computer program product of claim 10, wherein the cache map includes information on the local cache of each application server, where each local cache stores each runtime object available at the respective application server, wherein the cache map is updated in response to changes to any local cache of any of the application servers associated with the multi-tenant system, and wherein the cache map is updated by receiving updates on changes to the local caches associated with the plurality of application servers from listeners located at and executed by each application server, wherein each listener monitors and provides updated local cache information to the load balancer in response to changes to the local cache of the listener's respective application server.

15. The computer program product of claim 10, wherein identifying the at least one object in the model-based application associated with identified request includes:
- identifying at least one object required to respond to the identified request; and
- identifying at least one object associated with at least one potential operation to be performed subsequent to the initial response to the identified request, wherein identifying the at least one object associated with at least one potential operation to be performed subsequent to the initial response to the identified request is based on a relationship of the at least one object associated with the at least one potential object to the at least one identified object required to respond to the identified request within the model-based application.

16. The computer program product of claim 10, wherein the determination of the particular application server to send the identified request for processing is based on an algorithm weighing availability of locally-cached versions of the at least one runtime version at each of the application servers and the relative processing load of each application server.

17. A system, comprising:
- at least one processor;
- a computer-readable storage medium coupled to the at least one processor having instructions stored thereon which, when executed by the at least one processor, cause the processor to perform operations comprising:
  - identifying, at a load balancer, a request related to a model-based application executing in a multi-tenant system, wherein the multi-tenant system is associated with a plurality of application servers, and wherein the load balancer manages routing of identified requests related to the model-based application to particular application servers in the multi-tenant system;
  - identifying, by the load balancer, at least one object in the model-based application associated with the identified request, wherein identifying the at least one object includes accessing a metadata repository associated with the model-based application to identify one or more objects associated with the identified request;
  - accessing, by the load balancer, a multi-tenant cache map storing information defining a current status of local caches of each of the plurality of application servers in the multi-tenant system maintained by the load balancer, wherein the multi-tenant cache map collects local cache information from each of the plurality of application servers in the multi-tenant system and identifies at least the locally-cached runtime versions of objects available in the corresponding local cache of the particular application servers;

identifying, by the load balancer using the multi-tenant cache map, at least two application servers from the plurality of application servers based on a determination that the at least two application servers include, at a time the request is identified, a locally-cached version of at least one runtime version of the at least one identified object in the model-based application as determined based on the current status of the local caches of the at least two application servers as defined in the multi-tenant map; and in response to identifying the at least two application servers, determining, by the load balancer, a particular application server from the at least two application servers to send the identified request for processing based at least in part on a combination of the locally-cached version of the at least one runtime version being available at the particular application server and the relative processing load of the particular application server as compared to the other application servers in the at least two identified application servers; and sending, by the load balancer, the identified request to the determined particular application server for processing.

18. The method of claim 2, wherein the identified second object in the model-based application associated with the identified request is needed for additional processing of the model-based application.

* * * * *